US012760564B2

(12) United States Patent
O'Neill

(10) Patent No.: US 12,760,564 B2
(45) Date of Patent: Oct. 13, 2026

(54) METHOD FOR ENABLING UNLOCKING OF A VEHICLE DOOR OF A VEHICLE

(71) Applicant: Volvo Car Corporation, Gothenburg (SE)

(72) Inventor: Liam O'Neill, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 37 days.

(21) Appl. No.: 18/751,668

(22) Filed: Jun. 24, 2024

(65) Prior Publication Data

US 2025/0003262 A1 Jan. 2, 2025

(30) Foreign Application Priority Data

Jun. 27, 2023 (EP) .................................... 23181857

(51) Int. Cl.

| | |
|---|---|
| ***E05B 77/22*** | (2014.01) |
| ***B60K 35/10*** | (2024.01) |
| ***B60K 35/22*** | (2024.01) |
| ***B60K 35/28*** | (2024.01) |
| ***E05B 81/56*** | (2014.01) |

(52) U.S. Cl.

CPC .............. *E05B 77/22* (2013.01); *B60K 35/10* (2024.01); *B60K 35/22* (2024.01); *B60K 35/28* (2024.01); *E05B 81/56* (2013.01); *B60K 2360/128* (2024.01); *B60K 2360/1434* (2024.01); *B60K 2360/162* (2024.01); *B60K 2360/171* (2024.01)

(58) Field of Classification Search

CPC ......... E05B 77/22; E05B 81/56; B60K 35/28; B60K 35/10; B60K 35/22; B60K 2360/1434; B60K 2360/171; B60K 2360/162; B60K 2360/119

See application file for complete search history.

(56) References Cited

U.S. PATENT DOCUMENTS

| | | | | | |
|---|---|---|---|---|---|
| 6,497,436 | B1 * | 12/2002 | DeBlock | E05B 81/06 | 292/201 |
| 6,554,329 | B1 * | 4/2003 | DeBlock | E05B 83/36 | 292/216 |
| 8,562,037 | B2 * | 10/2013 | Leda | E05B 49/00 | 292/336.3 |
| 8,590,210 | B2 * | 11/2013 | Schindhelm | E05F 15/70 | 49/502 |
| 2004/0124027 | A1 * | 7/2004 | Aiyama | E05B 77/12 | 180/274 |
| 2011/0248844 | A1 * | 10/2011 | Elias | E05B 77/28 | 701/36 |

(Continued)

OTHER PUBLICATIONS

Search Report issued for EP Application No. 23181857.6, mailed on Dec. 1, 2023, 8 pages.

*Primary Examiner* — Mark A Williams

(74) *Attorney, Agent, or Firm* — Dave Law Group, LLC; Raj S. Davé

(57) ABSTRACT

Embodiments herein relate to a method comprising receiving a signal indicative of an intention of a person for opening the vehicle door from outside the vehicle, and providing an indication of an input means inside the vehicle upon receival of the signal, wherein the input means is configured to be operable by a passenger inside the vehicle, and wherein the input means is configured to unlock the vehicle door based on an operation by the passenger.

13 Claims, 7 Drawing Sheets

(56) References Cited

U.S. PATENT DOCUMENTS

| | | | | |
|---|---|---|---|---|
| 2012/0139269 | A1* | 6/2012 | Kouzuma | E05B 81/14 292/195 |
| 2015/0300046 | A1* | 10/2015 | Lange | B60R 21/02 701/49 |
| 2017/0210342 | A1* | 7/2017 | De Wind | E05B 85/10 |
| 2018/0345791 | A1* | 12/2018 | Hallack | B60R 13/04 |
| 2021/0158638 | A1* | 5/2021 | Hassani | G07C 9/00309 |

* cited by examiner

METHOD FOR ENABLING UNLOCKING OF A VEHICLE DOOR OF A VEHICLE

CROSS-REFERENCE TO RELATED APPLICATIONS

This application claims the benefit of European Patent Application Number 23181857.6, filed on Jun. 27, 2023, which is hereby incorporated by reference in its entirety.

TECHNICAL FIELD

The present disclosure relates to a method for enabling unlocking of a vehicle door of a vehicle, a computer program product, a system, and a vehicle.

BACKGROUND

There are situations when using vehicles, where the experience of unlocking a vehicle door is not ideal or at least as good as it should be. Such situation may be, for example, when the driver of a vehicle is picking up one or more persons, e.g., from the train station. In this situation, the driver may be already arriving ahead of the arranged meeting time, which was arranged with this person, and wait for them to arrive. While waiting, the driver may be busy, for example, by using his smartphone and not observe when the person actually arrives at the vehicle.

Once the person arrives at the vehicle, he may try to use the exterior door handle of one of the passenger vehicle doors of the driver's vehicle to access the vehicle. However, these may be locked as a safety measure. After the driver recognizes that the person that he was waiting for is trying to access the vehicle, the driver has typically different options to unlock the vehicle door. For example, the driver may use a central unlocking means, e.g., in the form of a button, inside the vehicle or on his vehicle key to unlock all vehicle doors. Alternatively, he may unlock the vehicle door manually with a door handle inside of the vehicle.

SUMMARY

It was found, by the inventor, that in situations like the one described above, the driver may be surprised by the exterior door handle being pulled when hearing a sound corresponding to the exterior door handle being pulled. In particular when the driver is distracted, e.g., using his smartphone, such situation may be stressful to the driver for a short moment. The stressful moment may continue even after he sees the person he was waiting for and thereby knows that it is not an unknown person trying to access the vehicle. This is because the driver typically wants to react quickly und unlock the corresponding vehicle door, but it has been found by the inventor that he may not know how to react in the best way.

While many vehicles have central unlocking means to unlock the vehicle doors, it has been further found that many drivers often tend to follow a rather intuitive but physically uncomfortable way of opening the vehicle door manually via a door handle inside the vehicle rather than using the central unlock means in situations like the one described above. This is because the driver may need to lean over the front passenger's seat. For doing that, he may even need to unbuckle the seat belt before being able to reach the vehicle door's door handle.

This may happen because the driver may not be aware of where the central unlocking means is located because he has not used them frequently, for example. As another example, this may happen if the vehicle is a rental vehicle, with which the driver is not well acquainted.

The experience involved with unlocking the vehicle doors may also be psychologically unpleasant due to the stressful moment continuing at least until the driver has unlocked the vehicle door. Both the physical and the psychological discomfort make the experience cumbersome and not as seamless as one would desire.

The problem is at least partially solved or alleviated by the subject matter of the independent claims of the present disclosure, wherein further examples are incorporated in the dependent claims.

According to a first aspect, there is provided a method for enabling unlocking of a vehicle door of a vehicle or unlocking of a vehicle door of a vehicle, the method comprising:

- receiving a signal indicative of an intention of a person for opening the vehicle door from outside the vehicle,
- providing an indication of input means inside the vehicle upon receival of the signal, the input means being configured operable by a passenger inside the vehicle and the input means being configured to unlock the vehicle door based on an operation by the passenger.

Accordingly, when using the method, the intention of a person to open the vehicle door is recognized by receival of the signal being indicated thereof and an indication of an input means is specifically provided inside the vehicle in reaction to this recognition. The input means is accessible to a passenger, e.g., the driver, inside the vehicle to be operated such that the vehicle door for which the intention of the person for opening the vehicle door has been recognized.

By providing the indication of the input means upon receival of the signal or, in other words, in reaction to receival of the signal, the focus of the passenger, e.g., the driver of the vehicle, or passengers inside the vehicle is directed at the input means and the passenger or passengers are guided to the optimal way of unlocking the vehicle door. This makes the unlocking process of vehicle doors in situations like the one described above very smooth and seamless. Specifically, the driver or any passenger inside the vehicle are relieved from the stress of having to unlocking the vehicle door as fast as possible and they do not experience physical discomfort.

According to the method, it is possible to only provide an indication of input means. This means that the input means need not necessarily to be also provided. Instead, the input means may already be there, e.g., a physical central unlocking means, e.g., in the form of a button. For example, the indication may comprise text and/or illustration of how and/or where to operate the input means. For example, the illustration may be illustrating a control section of the vehicle with several control buttons, one of which being a central unlocking button. This central unlocking button may be highlighted in the illustration graphically and/or by text describing it as the central unlocking button. Also, the text may contain description of the location of the central unlocking button, e.g., the central unlocking button is located on the vehicle door to your left next to its handle.

The method may be at least partially computer-implemented, which means that one, multiple or all of the steps of the method may be computer-implemented. Also, the method may be implemented in software or in hardware, or in software and hardware. Further, the method may be carried out by computer program instructions running on means that provide data processing functions. Such data processing means may be a suitable computing means, such as an electronic control module etc., which may also be a distributed computer system. The data processing means or the computer, respectively, may comprise one or more of a processor, a memory, a data interface, or the like.

In an example, the indication of the input means may be provided together with the input means. In this case, the input means is provided inside the vehicle upon receival of the signal. This means that the input means is provided specifically for the situation when the signal is received and that the input means may be different from and additional to any other input means that may be already there before the receival of the signal, e.g., a physically or digitally implemented central unlocking button or interior handles of the vehicle doors. The indication of such input means may be a text, picture or generally a description indicating that the vehicle door or vehicle doors will be unlocked when operating, in particular interacting with, the input means. Alternatively, only the input means themselves may be provided without an indication of them.

Providing the input means ensures a particularly seamless and smooth process of unlocking the vehicle door because the driver may not even need to be hinted at the best way of unlocking the vehicle door, but the input means is specifically provided to him inside the vehicle. This allows a very prominent provision of the input means to the driver or passengers of the vehicle, which may include visual, acoustic, and/or vibrational provision of the input means. In particular, the input means may be provided within arm's reach of the driver or driver's seat of the vehicle such that the driver or front passenger may seamlessly and without any physical discomfort operate the input means in order to unlock the vehicle door.

Also, there is the possibility of providing an indication of an input means independent from the receival of the signal, i.e., input means already present, e.g., a physical button, and providing of input means upon receival of the signal, i.e., additional input means to the one already present, together. In this case, the driver or passengers may learn where the already present input means is located, e.g., a physical central unlocking button, and for the particular situation in which the signal is received the additional input means, e.g., digital, or software-implemented input means, is still provided and at his disposal to make the unlocking process smooth and easy.

According to an example, the indication of the input means and/or the input means may be provided on a display of the vehicle. The display may in particular be an internal display of the vehicle. For example, the display may be associated with an infotainment system of the vehicle, on which further information or functions may be displayed, e.g., a GPS navigation function, map information air climate control information and control functions, radio, and the like. Providing the indication of the input means and/or providing the input means on the display has the advantage that the display, in particular the one of the infotainment system, is easily accessible and a point of interest of the driver such that the input means may be operated with case and in a quick manner to unlock the vehicle door.

According to an example, the input means may be configured to be operable by the passenger by touch interaction with the display. Accordingly, the display may be configured as a touch display. This makes it particularly easy and intuitive to operate the input means.

According to an example, the input means may be configured as a single button on the display. The button may accordingly be digital or software implemented. This has the advantage that no further stress is caused by providing different buttons in the already stressful situation that the passenger, in particular, driver may be in, when he hears the sound corresponding to an exterior door handle of the vehicle being pulled or he sees a person he would like to grant access to the vehicle.

According to an example, the input means may be configured only to unlock the vehicle door. In particular, there may be only a single unlock button on the display as input means provided upon receival of the signal. This has the further advantage that no further stress is caused by providing different options to the passenger in an already stressful situation, e.g., by providing an unlock button and a lock button. In particular, it has been found that passengers, in particular drivers, may make wrong decisions when giving them different options in stressful situations. Also, such options may increase stress levels. Therefore, when providing only the option to unlock the vehicle door by the input means, the stress level is kept at a minimum and the passenger has merely to decide whether he wants to grant vehicle access to the outside person and if so, operate the input means and otherwise not operate it.

According to an example, the single button may be indicated as an unlocking operation of the vehicle door on the display. This adds to the safety of the operability of the button by the passenger.

According to an example, the method may be further comprising:

expiring of the input means such that the input means cannot be operated if the input means is not being operated by the passenger.

This has the advantage that, when the passenger does not decide to unlock the vehicle door, the input means may be removed such that the passenger does not accidentally unlock the vehicle door later on. Also, in case the input means is provided on a display, the display may at least partially or fully be made available to other functions and/or information provided thereon. The expiry of the input means on the display may be implemented as a removal of the input means or an expiry of its operability, e.g., by greying out the button as which the input means may be configured. The expiry may be triggered by an event or action of the passenger, in particular the driver. The event may correspond to driving of the vehicle, for example. An action may correspond to interaction of the driver with the vehicle, e.g., the infotainment system, the navigation system, or similar, for example by operating a button or touching the display in another region than where the input means is located on the display.

In an example, the input means may be configured to expire when the input means is not being operated by the passenger during a predetermined period of time after providing the input means. Thereby, an alternative or additional trigger to the one described before may be provided for expiry of the input means. The period of time may be predetermined in the range of 1 to 10 seconds, in particular in the range of 2 to 6 seconds, for example. For example, the period of time may be 2 seconds. Accordingly, when the period of time runs out, the input means expires and is not operable anymore.

In an example, the signal may be indicative of an interaction of the person with an exterior handle of the vehicle door. For example, the vehicle, in particular the vehicle door or the exterior handle, may comprise a recognition unit, e.g., in the form of a sensor, recognizing when the exterior handle is being operated, e.g., pulled, when the exterior handle is a physical pullable handle. Such recognition unit may generate a signal, which may be forwarded to a system, e.g., a control unit, of the vehicle, which may receive it and carry out the method of this disclosure. Alternatively, or additionally, interaction may be an approaching of the person towards the vehicle, in particular the vehicle door, which may be recognized by detection means of the vehicle, e.g., one or more cameras, sensors or similar.

In an example, the input means may be configured to unlock one or more passenger vehicle door, a trunk vehicle door, and/or a boot vehicle door. Accordingly, the input means may be configured to unlock a different number and/or types of vehicle doors. Herein, a vehicle door is generally understood as any door in a broad sense which gives access to the interior of the vehicle, which may be the passenger interior space, the trunk, or the boot, for example. The boot may be a frunk (front trunk opposed to a conventional trunk in the back of the vehicle), especially in battery electric vehicles, and thus, similar to the trunk provide the possibility to place luggage and other items inside. Accordingly, advantageously, the input means can grant trunk and/or frunk access to the person.

In an example, the input means may be configured such that the passenger, by operating, in particular interacting with, the input means, may select the vehicle door or vehicle doors from a number of vehicle doors of the vehicle to be opened.

In an example, the input means may be configured to unlock only the vehicle door or vehicle doors, for which a signal indicative of an intention for opening the vehicle door or vehicle doors from outside of the vehicle has been received. In an alternative example, the input means may be configured to unlock multiple or all vehicle doors of the vehicle. Such configurations of the input means may be preset. The presetting may be based on user selection in a corresponding settings menu of the vehicle, in which the different configurations may be selected.

In an example, the method may further comprise:

- displaying a further indication inside the vehicle upon receival of the signal, the further indication indicating the vehicle door or vehicle doors for which the signal indicative of the intention of the person for opening it or them has been received.

Thereby, the passenger may quickly recognize where to look at to identify the person trying to get access to the vehicle. For example, if the person is trying to access the trunk vehicle door, it may take some time for the passenger to spot this as he will need to look in the mirror or turn his head. The further indication guides him on where to look, thereby making the unlocking process even smoother.

According to a second aspect, there is provided a computer program product comprising instructions which, when the program is executed by a computer, cause the computer to carry out the method of this disclosure.

For example, the computer program product may be a computer program as such or a product comprising the computer program, where the product may be a computer-readable medium such as a data storage medium.

According to a third aspect, there is provided a system comprising means for carrying out the method of this disclosure.

For example, the system may comprise a computer or computing means to execute the instructions of the computer program product of this disclosure. Further, the system may comprise the computer program product as a computer-readable medium. Thereby, the storage medium can provide the instructions to the computer to be executed.

According to a fourth aspect, there is provided a vehicle being configured for carrying out the method of this disclosure.

The vehicle may comprise the computer program product and/or the system of this disclosure. For example, the system may be implemented as a control unit of the vehicle, the control unit comprising the computer program product or at least being configured to receive instructions from the computer program product.

According to a fifth aspect, disclosed is a method comprising receiving a signal indicative of an intention of a person for opening a vehicle door from outside a vehicle; and providing an indication of input means inside the vehicle upon receival of the signal; wherein the input means is configured to be operable by a passenger inside the vehicle; and wherein the input means is configured to unlock the vehicle door based on an operation by the passenger. In an embodiment, the method is for enabling unlocking of a vehicle door of a vehicle. In another embodiment, the method is for unlocking of a vehicle door of a vehicle.

According to a sixth aspect, disclosed is a non-transitory computer-readable medium storing a sequence of instructions, which when executed by a processor causes receiving a signal indicative of an intention of a person for opening a vehicle door from outside a vehicle, and providing an indication of input means inside the vehicle upon receival of the signal, wherein the input means is configured to be operable by a passenger inside the vehicle, and wherein the input means is configured to unlock the vehicle door based on an operation by the passenger.

According to a seventh aspect, disclosed is a system comprising a processor and a non-transitory storage medium comprising instructions that, when executed, causes the processor to receive a signal indicative of an intention of a person for opening a vehicle door from outside a vehicle, and provide an indication of input means inside the vehicle upon receival of the signal, wherein the input means is configured to be operable by a passenger inside the vehicle, and wherein the input means is configured to unlock the vehicle door based on an operation by the passenger.

It should be noted that the above examples may be combined with each other irrespective of the aspect involved. Accordingly, the method may be combined with structural features and, likewise, the system and vehicle may be combined with features described above with regard to the method.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The Figures are merely schematic representations and serve only to illustrate examples of the disclosure. Identical, equivalent, or similar types of elements are in principle provided with the same reference signs. Some reference signs are provided with a numbering separated from the reference sign by a dot in order to distinguish between identical, equivalent, or similar types of elements to enhance intelligibility of this disclosure.

Figure 1:
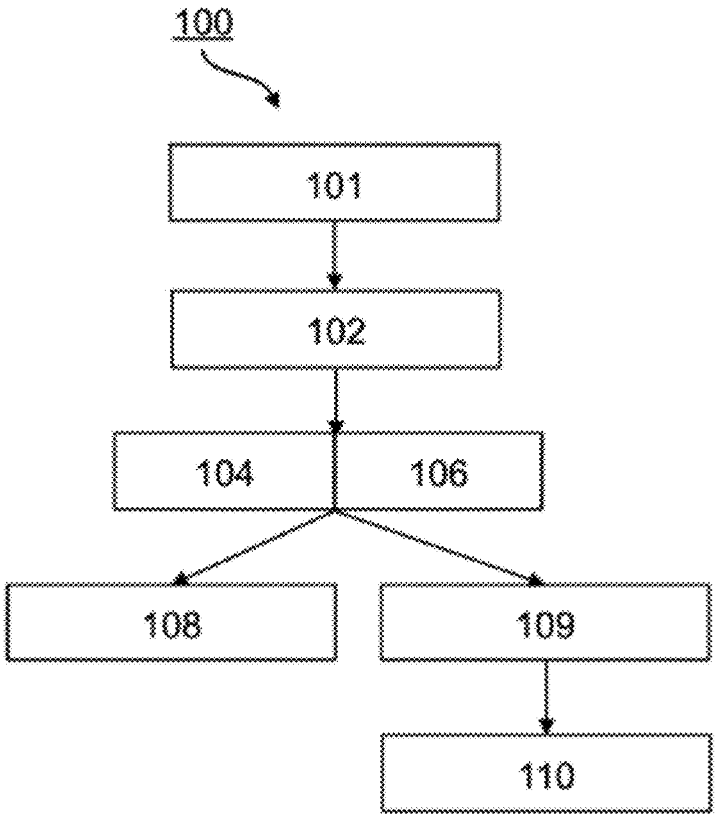
FIG. 1 shows an illustration of a method of this disclosure.

FIG. 1 shows a method 100 for enabling unlocking or unlocking of a vehicle door 2 of a vehicle 1 (see FIG. 2), which comprises steps 101, 102, 104, 106, 108, 109, 110. The enabling of the unlocking does not necessarily require the step of unlocking of the vehicle door 2, whereas the method 100 for unlocking of a vehicle door 2 comprises the unlocking step, which is referred to herein with reference sign 110. The steps 101, 102, 104, 106, 108, 109, 110 are described in a possible but non-limiting order of execution. The method 100 can also comprise a different order of the steps 101, 102, 104, 106, 108, 109, 110 and the method 100 does not necessarily require all steps 101, 102, 104, 106, 108, 109, 110, which are described herein.

Figure 2:
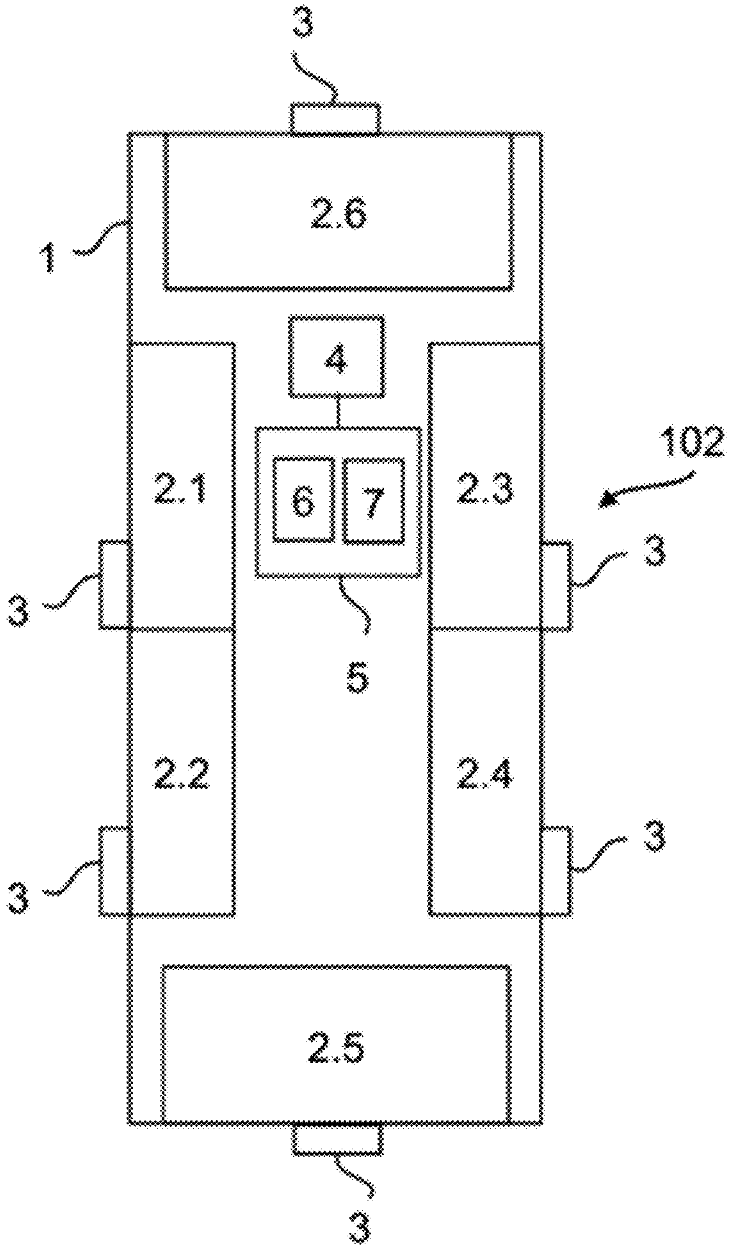
FIG. 2 shows an illustration of a vehicle of this disclosure.

FIG. 2 shows a vehicle 1 configured for carrying out the method 100 of FIG. 1. The vehicle 1 comprises several vehicle doors 2 and exterior handles 3 associated with these for opening them. The vehicle doors 2 may be locked, e.g., by a presetting in a central locking system of the vehicle 1, which may comprise a central locking means, such as a button, to lock and unlock the vehicle doors 2. The locking of the vehicle doors 2 may be performed by a presetting, e.g., when the vehicle 1 starts driving or is in a parked state, to increase security of the passengers of the vehicle 1 by preventing that outside persons can access the vehicle 1 without permission from the passengers, in particular the driver of the vehicle 1.

In this example, four vehicle doors 2 are configured as passenger vehicle doors 2.1, 2.2, 2.3, 2.4, one vehicle door 2 is configured as a trunk vehicle door 2.5 and another one of the vehicle doors 2 is configured as a boot vehicle door 2.6. The vehicle 1 further comprises a display 4, which may be from an infotainment system, and a system 5 comprising means for carrying out the method 100 of FIG. 1, wherein the system 5 may be control unit, for example. The means of the system 5 are a computer program product 6 and a computer 7 or, in other words, a computer means or data processing means for processing the data from the computer program product 6, which may be a data storage medium, for example.

For step 101 of method 100, a person outside of the vehicle 1 in FIG. 2 tries to open a vehicle door 2 of the vehicle 1. For example, the person may try to open the vehicle door 2.3 in FIG. 2, which may correspond to a front passenger vehicle door, while the vehicle door 2.1 may correspond to the driver vehicle door. The driver is herein understood as a passenger similar to other passengers inside the vehicle 1 but sitting on the driver seat to drive the vehicle 1. For example, the person may pull an exterior handle 3 of the vehicle door 2.3 for step 101.

Consequently, in step 101 of method 100 a signal is being generated, in particular by the vehicle 1, e.g., the exterior handle 3 or the system 5 or another control unit. The signal is indicative of the intention of the person for opening the vehicle door 2.3 from outside the vehicle 1 by virtue of pulling its exterior handle 3.

In step 102 of method 100, this signal is being received by or on the vehicle 1, in particular by the system 5.

In step 104 of method 100, an input means 12 is provided inside the vehicle 1 and by the vehicle 1, in particular by the system 5 and/or display 4, upon the receival of the signal in step 102. The input means 12 is configured operable by a passenger inside the vehicle 1. Also, the input means 12 is configured to unlock one or more of the vehicle doors 2 of the vehicle 1 based on an operation by one or more passengers of the vehicle 1, e.g., the driver of the vehicle 1.

Figure 3:
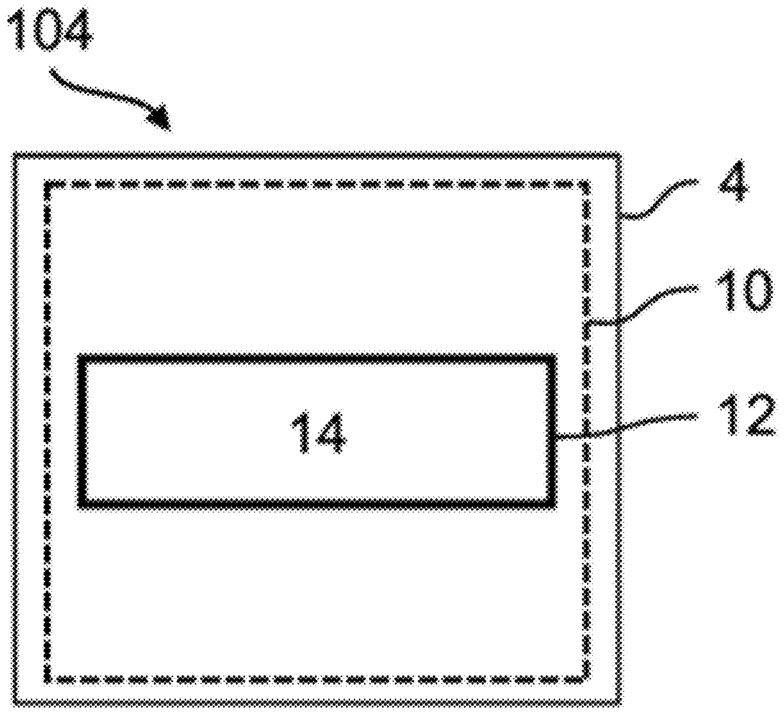
FIG. 3 shows an illustration of a display in the vehicle of FIG. 2.

Step 104 is illustrated in FIG. 3 on the display 4. Specifically, the input means 12 is provided on the display 4 as a single button being configured only to unlock one or more of the vehicle doors 2, in particular the vehicle door 2.3 whose exterior handle 3 was pulled by the person outside of the vehicle 1.

FIG. 3 shows how the input means 12 is displayed on a graphical user interface 10 (GUI) of the display 4. The GUI may display further functions and/or information besides the input means 12. However, such further functions and/or information may be pushed into a background behind the input means 12, e.g., by greying these out, or removed for the time the input means 12 is displayed.

Further, in this example, step 104 further provides an indication 14 of the input means 12. The indication 14 may be a text indicating the effect of operating the input means 12, e.g., "unlock vehicle door" or "unlock vehicle doors". In particular, the operating of the input means 12 may be by touch interaction, wherein the display 4 may be configured as a touch display, i.e., a display receiving input through touch.

In step 108 of method 100, the input means 12 may expire. In this case, the input means 12 cannot be operated anymore. The expiry can occur if the input means 12 is not being operated by the passenger within a predetermined period of time, e.g., 2 seconds, after the input means 12 is displayed on the display 4.

Figure 4:
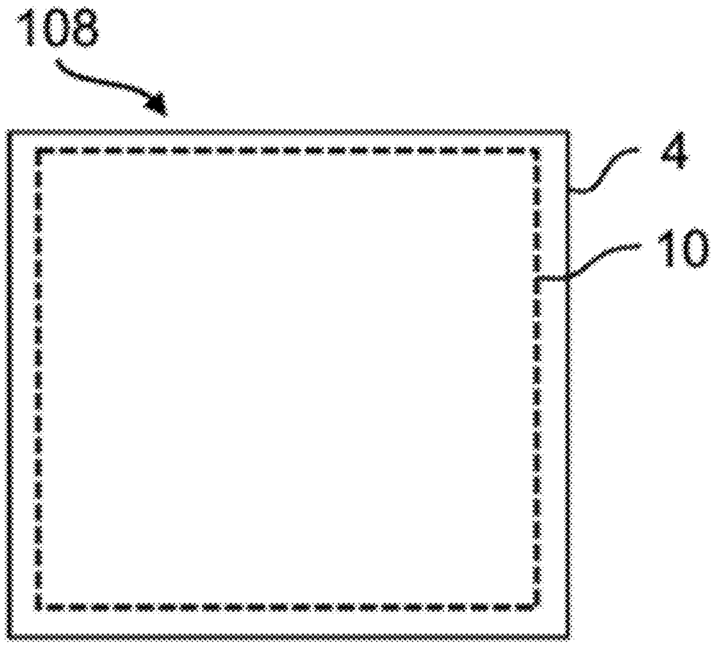
FIG. 4 shows a further illustration of the display in the vehicle of FIG. 2.

Step 108 is illustrated in FIG. 4 showing how the input means 12 is not being present on the GUI 10 anymore.

Figure 5:
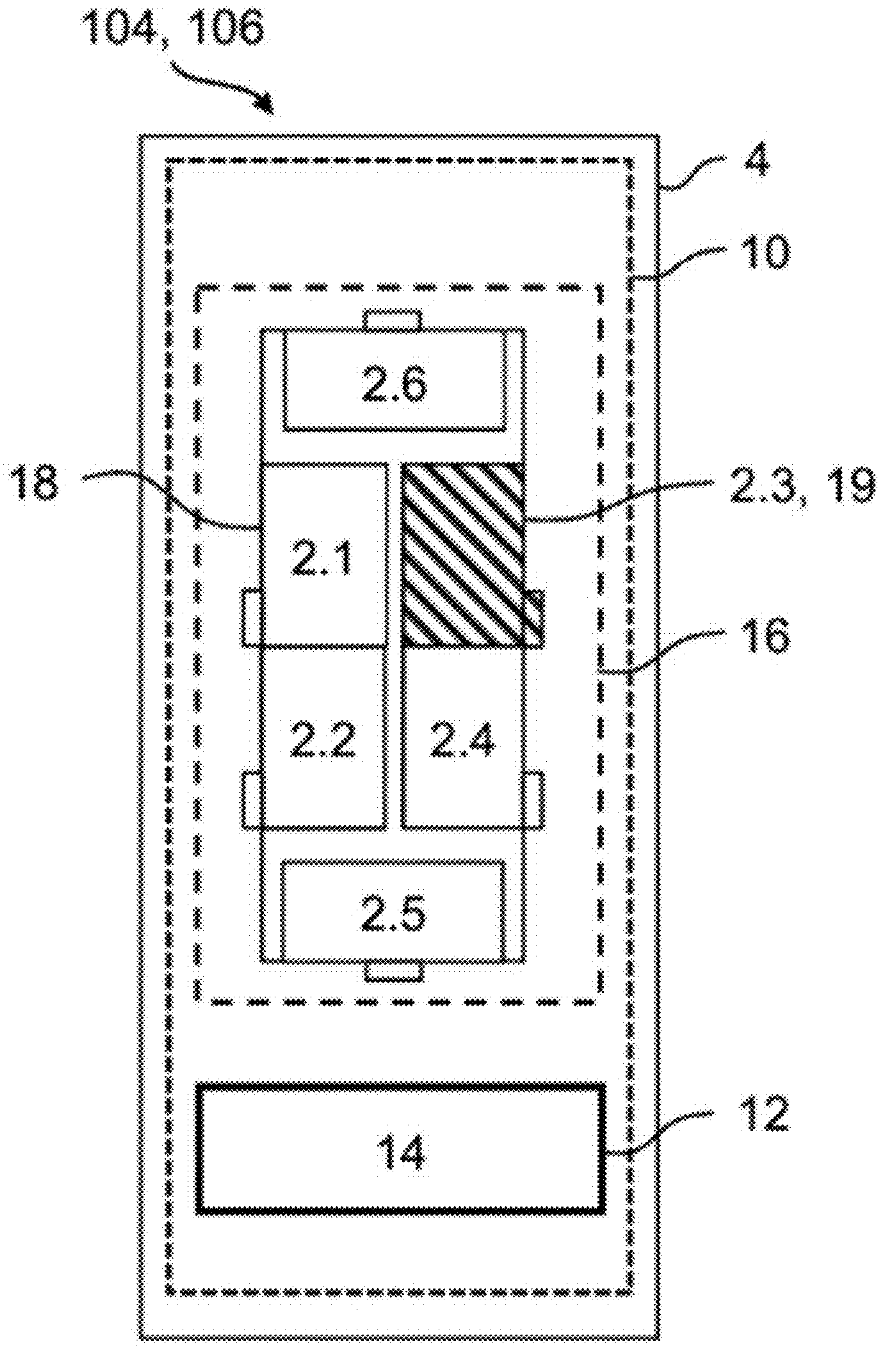
FIG. 5 shows a further illustration of the display in the vehicle of FIG. 2.

As an additional step 106 of method 100, it is possible to provide a further indication inside the vehicle 1, in particular on the display 4 as shown in FIG. 5. This further indication may be displayed upon receival of the signal and indicate the vehicle door 2.3, for which in this example the signal indicative of the intention of the person for opening it has been received.

In the example of the GUI 10 of display 4 in FIG. 5, a vehicle representation 18 is shown for this purpose showing all vehicle doors 2.1, 2.2, 2.3, 2.4, 2.5, 2.6 in the further indication 16. In this example of the further indication 16, the representation of the passenger vehicle door 2.3 comprises a highlighting 19 showing to the passenger or passengers inside the vehicle 1 that the exterior handle 3 of the front passenger vehicle door 2.3 has been pulled.

In step 109, if the input means 12 does not expire but alternatively one of the passengers, e.g., the driver, of the vehicle I operates the input means 12 by pressing the corresponding button display on the display 4, an unlock control instruction is being generated.

The unlock control instruction may be forwarded, e.g., by the system 5, to a respective control unit for unlocking the vehicle door 2.3 or be executed by the system 5 itself, for example. In consequence, when the unlock control instruction is being executed, the vehicle door 2.3 is unlocked in step 110 of the method 100.

Figure 6:
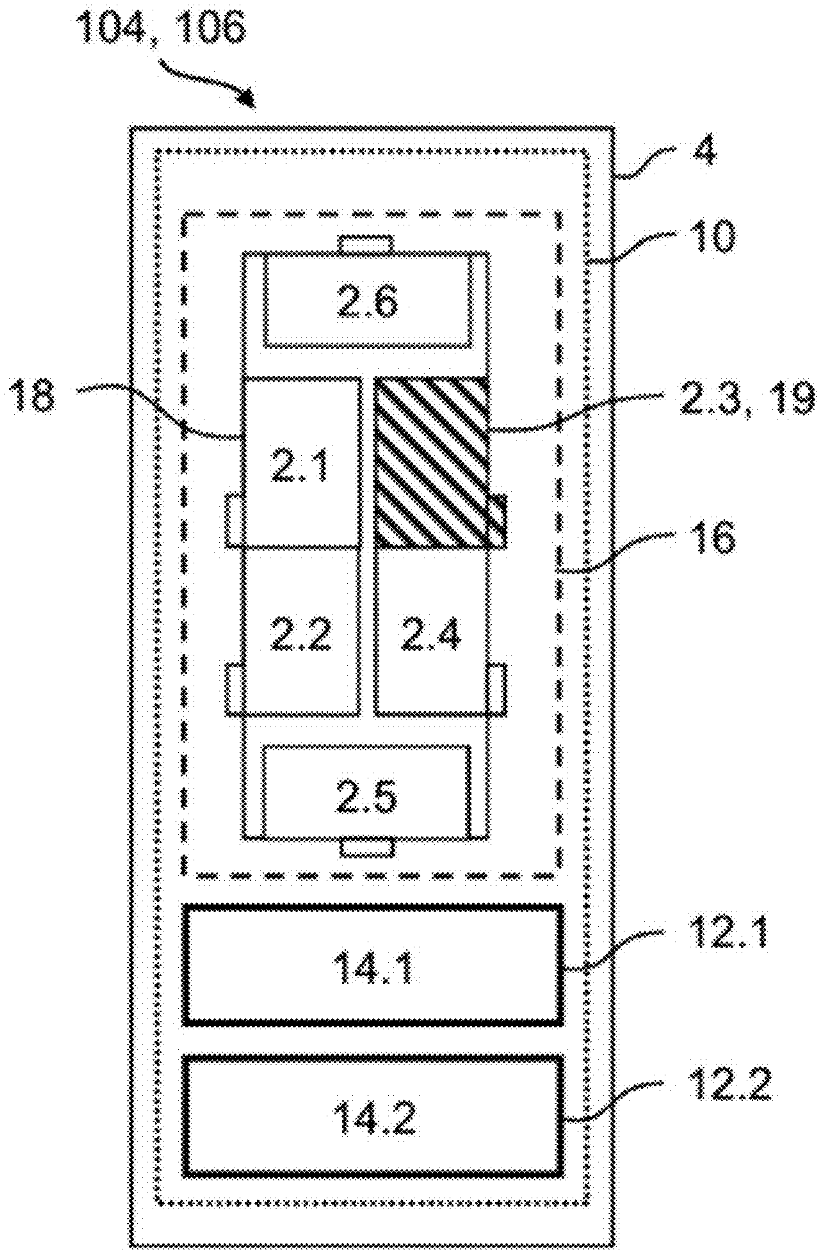
FIG. 6 shows a further illustration of the display in the vehicle of FIG. 2.
Figure 7:
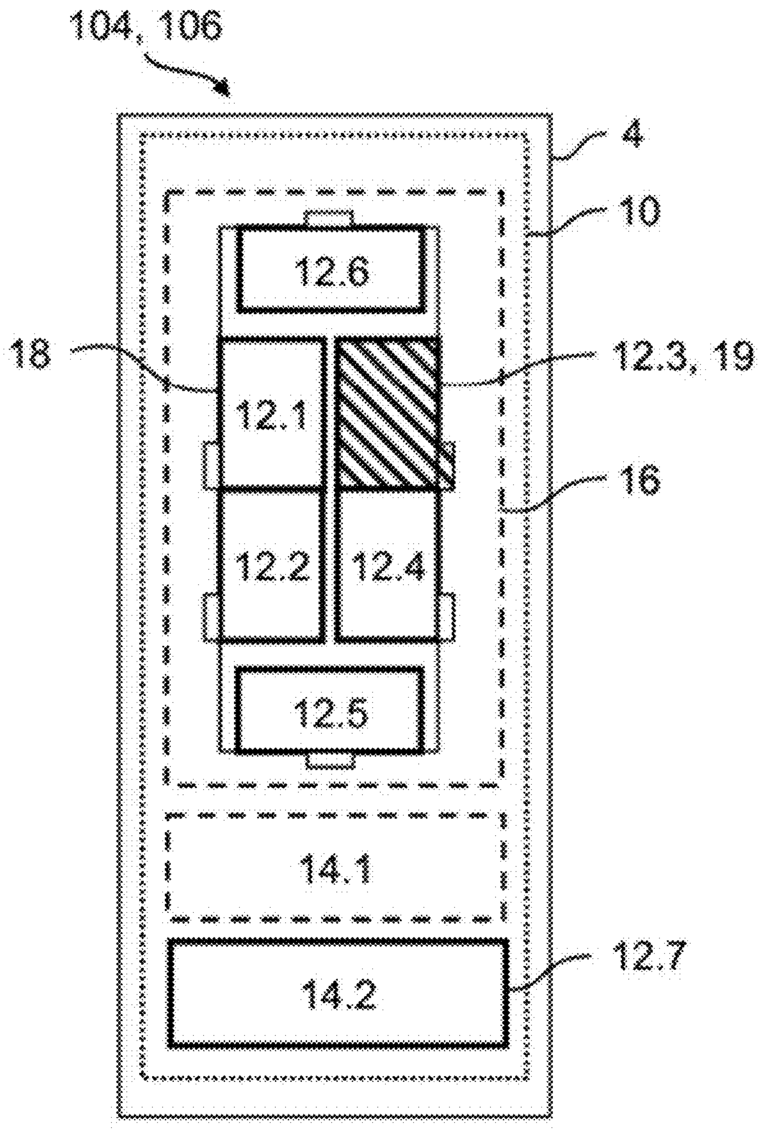
FIG. 7 shows a further illustration of the display in the vehicle of FIG. 2.

Alternatives for enabling control for the passenger or passengers of the vehicle 1 over which vehicle door(s) 2 are being opened when the input means 12 is being operated are being shown in FIGS. 6 and 7.

In FIG. 6, there are two input means 12.1, 12.2 with respective indications 14.1, 14.2. One of these input means 12.1, 12.2 may be configured for opening only the vehicle door 2 for which the intention of the person for opening it from outside of the vehicle 1, e.g., by pulling its exterior handle 3, has been recognized by means of receival of the signal indicative thereof. The other one of the input means 12.1, 12.2 may be configured for opening all vehicle doors 2 or at least all passenger vehicle doors 2.1, 2.2, 2.3, 2.4. Alternatively, the other one of the input means 12.1, 12.2 may be configured for opening the trunk vehicle door 2.5 and/or the boot vehicle door 2.6 or another input means 12 may be provided on the display 4, in particular its GUI 10, to provide such configuration.

In FIG. 7, there is an input means 12.7 configured for opening all vehicle doors 2 or at least all passenger vehicle doors 2.1, 2.2, 2.3, 2.4. Additionally, or alternative, as shown in FIG. 7, there may be individual input means 12.1, 12.2, 12.3, 12.4, 12.5, 12.6 for each one or multiple of the vehicle doors 2.1, 2.2, 2.3, 2.4, 2.5, 2.6. The indication 14.2 may be for all individual input means 12.1, 12.2, 12.3, 12.4, 12.5, 12.6 and comprise a description for the passenger that upon selection of any of the vehicle doors 2.1, 2.2, 2.3, 2.4, 2.5, 2.6 in the vehicle representation 18, the respective vehicle door 2.1, 2.2, 2.3, 2.4, 2.5, 2.6 will be unlocked. For intuitive operability or interaction with the passenger of the vehicle 1, the input means 12.1, 12.2, 12.3, 12.4, 12.5, 12.6 in FIG. 7 arc embedded as buttons in the vehicle representation 18, in particular such that the input means 12.1, 12.2, 12.3, 12.4, 12.5, 12.6 correspond in location to the location of the respective vehicle doors 2.1, 2.2, 2.3, 2.4, 2.5, 2.6 in the vehicle representation 18.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

A computing device or system may include a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The computing system may include clients and servers. A client and server are remote from each other and typically interact through a communication network. The relationship of the client and server arises by virtue of computer programs running on the respective computers and having a client-server relationship with each other.

As used herein the term "component" refers to a distinct and identifiable part, element, subsystem, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

The terms "non-transitory computer-readable storage medium" and "machine-readable storage medium" include a single medium or multiple media such as a centralized or distributed database, and/or associated caches and servers that store one or more sets of instructions. Further, the terms "non-transitory machine-readable storage medium" and "machine-readable storage medium" include any tangible medium that is capable of storing, encoding, or carrying a set of instructions for execution by a processor that, for example, when executed, cause a system to perform any one or more of the methods or operations disclosed herein. As used herein, the term "machine-readable storage medium" is expressly defined to include any type of computer-readable storage device and/or storage disk and to exclude propagating signals.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

Further, a computer system including one or more processors and machine-readable storage media such as computer memory may practice the methods. In particular, one or more processors execute computer-executable instructions, stored in the computer memory, to perform various functions such as the acts recited in the embodiments.

As used herein the term "data processing unit" may be used interchangeably with processor in many contexts. Both terms generally refer to a component or unit within a computing system that is responsible for carrying out operations on data. The processor, or central processing unit (CPU), is an element of a computer that performs arithmetic and logic operations, executes instructions from computer programs, and manages data movement within the system.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Machine-readable storage media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

Digital electronic circuitry, or in computer software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a machine-readable storage medium for execution by, or to control the operation of, data processing apparatus. The machine-readable storage medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

Aspects of the one or more embodiments described herein are described with reference to flowchart illustrations and/or block diagrams of methods, apparatus (systems), and computer program products according to one or more embodiments described herein. Each block of the flowchart illustrations and/or block diagrams, and combinations of blocks in the flowchart illustrations and/or block diagrams, can be implemented by machine-readable storage program instructions. These computer-readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer-readable program instructions can also be stored in a computer-readable storage medium that can direct a computer, a programmable data processing apparatus and/or other devices to function in a particular manner, such that the computer-readable storage medium having instructions stored therein can comprise an article of manufacture including instructions which can implement aspects of the function/act specified in the flowchart and/or block diagram block or blocks. The computer-readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

LIST OF REFERENCE SIGNS

1 vehicle
2 vehicle door
2.1-2.4 passenger vehicle door
2.5 trunk vehicle door
2.6 boot vehicle door
3 exterior handle
4 display
5 system
6 computer program product
7 computer
10 graphical user interface
12 input means
14 indication
16 further indication
18 vehicle representation
19 highlighting
100 method
101-110 steps

What is claimed is:

1. A method comprising:
receiving a signal from a sensor indicative of an intention of a person for opening a vehicle door from outside a vehicle; and
providing, inside the vehicle upon receival of the signal, an input element and an indication associated with the input element;
wherein the input element is configured to be operable by a passenger inside the vehicle, wherein the input element comprises a passenger-operable button;
wherein the input element is configured to unlock the vehicle door based on an operation by the passenger, and
wherein the method enables unlocking of the vehicle door by the passenger inside the vehicle for the person outside the vehicle.

2. The method of claim 1, wherein the indication associated with the input element is provided together with the input element.

3. The method of claim 2, wherein one or more of the indication associated with the input element and the input element are provided on a display of the vehicle.

4. The method of claim 3, wherein the input element is configured to be operable by the passenger by touch interaction with the display.

5. The method of claim 2, wherein the passenger-operable button is at least one of a digital button and a physical button.

6. The method of claim 2, wherein the input element is configured to unlock the vehicle door.

7. The method of claim 1, wherein the indication associated with the input element comprises one or more of a text and an illustration, wherein the illustration comprises one or more of how to operate the input element and where to operate the input element.

8. The method of claim 1, further comprising:

causing the input element to expire after a predetermined period of time after providing the input element if the passenger does not operate the input element during the predetermined period of time.

9. The method of claim 1, wherein the input element is configured to expire after a predetermined period of time after providing the input element.

10. The method of claim 1, wherein the signal is indicative of an interaction of the person with an exterior handle of the vehicle door.

11. The method of claim 1, wherein the vehicle door comprises one or more vehicle doors comprising a passenger vehicle door, a trunk vehicle door, and a boot vehicle door.

12. The method of claim 1, wherein the sensor comprises at least one of a handle interaction sensor, a force sensor, a proximity detection sensor, and an image sensor.

13. The method of claim 1, further comprising:

displaying a further indication inside the vehicle upon receival of the signal, the further indication identifying the vehicle door for which the signal has been received.

* * * * *